United States Patent
Hoder et al.

(10) Patent No.: US 6,459,881 B1
(45) Date of Patent: Oct. 1, 2002

(54) REPEATER FOR RADIO SIGNALS

(75) Inventors: Mathias Hoder; Wolfgang Kreuz, both of Bonn (DE)

(73) Assignee: T. Mobile Deutschland GmbH, Bonn (DE)

( * ) Notice: Subject to any disclaimer, the term of this patent is extended or adjusted under 35 U.S.C. 154(b) by 0 days.

(21) Appl. No.: 09/319,133

(22) PCT Filed: Dec. 2, 1997

(86) PCT No.: PCT/DE97/02807

§ 371 (c)(1),
(2), (4) Date: Aug. 12, 1999

(87) PCT Pub. No.: WO98/25421

PCT Pub. Date: Jun. 11, 1998

(30) Foreign Application Priority Data

Dec. 2, 1996 (DE) .......................................... 196 49 855

(51) Int. Cl.[7] .................................................. H04Q 7/20
(52) U.S. Cl. ...................................... 455/11.1; 455/13.1
(58) Field of Search ................................. 455/436, 443, 455/444, 450, 9, 20, 7, 21, 8, 22, 10, 11.1, 13.1, 13.3, 16, 517, 562, 437, 438, 439, 420, 423, 424, 464, 465, 524; 370/243, 246, 226, 274, 315, 492, 501; 340/505, 825.53, 10.1, 853.7

(56) References Cited

U.S. PATENT DOCUMENTS

| | | | | |
|---|---|---|---|---|
| 4,152,647 A | * | 5/1979 | Gladden et al. | ............ 455/11.1 |
| 4,539,706 A | * | 9/1985 | Mears et al. | ................ 455/11.1 |
| 4,745,632 A | * | 5/1988 | Duffy | ......................... 455/550 |
| 4,937,812 A | * | 6/1990 | Itoh et al. | .................... 370/246 |
| 5,010,544 A | * | 4/1991 | Chang et al. | ................ 370/243 |
| 5,095,528 A | * | 3/1992 | Leslie et al. | ................... 455/10 |
| 5,239,666 A | * | 8/1993 | Truby | ........................ 455/13.1 |
| 5,526,376 A | * | 6/1996 | Kellenberger et al. | ....... 375/211 |
| 5,541,979 A | | 7/1996 | Leslie et al. | .................... 379/60 |
| 5,548,803 A | | 8/1996 | Evans | .......................... 455/16 |
| 5,768,683 A | * | 6/1998 | Mulford | ...................... 370/315 |
| 6,097,968 A | * | 8/2000 | Bannister et al. | ............ 455/426 |
| 6,108,364 A | * | 8/2000 | Weaver, Jr. et al. | ......... 375/130 |
| 6,141,533 A | * | 10/2000 | Wilson et al. | ............. 455/11.1 |
| 6,246,883 B1 | * | 6/2001 | Lee | ........................ 340/870.02 |

FOREIGN PATENT DOCUMENTS

| | | |
|---|---|---|
| EP | 0 085 575 | 8/1983 |
| EP | 0 406 905 | 1/1991 |
| EP | 0 681 374 | 11/1995 |
| GB | 2 204 214 | 11/1988 |
| WO | WO 89/10660 | 11/1989 |
| WO | WO 95/24783 | 9/1995 |
| WO | WO 96/23370 | 8/1996 |

OTHER PUBLICATIONS

Translation of International Search Report, PCT/DE97/02807 dated Jan. 26, 1999.

* cited by examiner

*Primary Examiner*—Dwayne Bost
*Assistant Examiner*—Jean A Gelin
(74) *Attorney, Agent, or Firm*—Baker & Daniels

(57) ABSTRACT

A mobile repeater for relaying radio signals between mobile stations and base station of a digital cellular radio network as the repeater moves from cell to cell. The mobile repeater includes a downlink branch for receiving from the base station and retransmitting to the mobile stations, an uplink branch for receiving from the mobile stations and retransmitting to the base stations, and an intelligent control unit for supporting the transition of the relay connection as the repeater moves from one cell to an adjacent cell. The intelligent control unit measures the repeater receiving field intensity of base station radio signals, monitors signalizing traffic, controls the signal output level to force transition to a new base station, and tunes the repeater frequency channels to those used by the new base station.

33 Claims, 1 Drawing Sheet

REPEATER FOR RADIO SIGNALS

BACKGROUND OF THE INVENTION

1. Field of the Invention

The invention relates to a repeater for radio signals, preferably for mobile applications in digital, cellular radio networks.

A repeater is a type of relay station which receives, amplifies and retransmits the radio signals emitted by the base station of a radio network so that they can be received by the mobile stations in the radio network. Of course, a repeater also works in the opposite direction, i.e. the radio signals emitted by a mobile station are forwarded by the repeater to a base station in the radio network. In cellular radio networks repeaters are often used to expand the range of service, for example to service tunnels, large buildings, mountain valleys, etc. The use of repeaters is particularly advantageous when a line connection to a conventional base station is not possible or possible only with excessive effort because of the lack of infrastructure. Repeaters also exist for mobile use, particularly for the use in trains.

2. Description of the Related Art

The principle of a conventional repeater is the bi-directional amplification of radio signals in uplink and downlink direction, where the radio signals are received and sent on the same frequency. The downlink signal originating at the base station is received with a connection antenna, amplified and filtered in the downlink branch of the repeater and transmitted via a service antenna in the direction of the mobile station. At the same time, the uplink signal originating at the mobile station is received by the service antenna, amplified and filtered in the uplink branch of the repeater and transmitted to the base station via the connection antenna.

When used in vehicles, such as express trains, broad band repeaters transmitting a wide range of the frequencies used in the radio network are required so as to ensure proper function in each cell that is passed. The repeater's broad band working method naturally causes signal distortions (phase and amplitude errors, intermodulation, noise, etc.) which have a very negative effect on the quality of the radio connection.

BRIEF SUMMARY OF THE INVENTION

The present invention provides a mobile repeater for relaying radio signals between mobile stations and base stations of cellular radio network. The mobile repeater includes a tunable downlink branch, a tunable uplink branch, and an intelligent control unit. The tunable downlink branch receives and demodulates data streams from base station radio signals and modulates, amplifies, and retransmits the data streams as repeater radio signals in network standard format to the mobile station. The tunable uplink branch receives and demodulates data streams from mobile station radio signals and modulates, amplifies, and retransmits the data streams as repeater radio signals in network standard format to the base station. The intelligent control unit is coupled to the uplink and downlink branches and monitors signaling traffic components of the data streams. The intelligent control unit tunes the uplink and downlink branches from frequency channels used for a first base station to frequency channels used for a second base station to support handover of the relay connection from the first to the second base station.

It is the object of the invention to further develop a repeater of the above described type so as to reduce the loss of quality in the processed radio signals to a minimum and to ensure a trouble-free, mobile application of the repeater.

The problem is solved with the characteristics of patent claim 1.

The object of the invention is a repeater which demodulates and subsequently remodulates the received signals and selects the frequencies to be repeated.

The advantage of the invention is that the unavoidable noise in analog repeaters is prevented, thus significantly improving the quality of the radio connection. A further significant advantage is that the intelligent control unit of the invention recognizes the need for a change in channels as a result of the cell transition which significantly simplifies the handover process and makes the repeater particularly suitable for use in vehicles.

The repeater of the invention works according to the following functional principle:

As in a radio station of the respective radio network the signal received is filtered, amplified and demodulated (mobile station or base station). Preferably, the receiving field intensity is measured and used as the control signal for controlling the output of the transmission amplifier. In radio networks operating with TDMA (Time Division Multiple Access) the receiving field intensity is measured on a time slot basis. The demodulated, digital data stream is supplied to a modulator, amplified and then retransmitted.

In addition, in TDMA systems the burst sides (power ramping) are formed system-specific in order to obtain the smallest possible switching spectrum. The burst amplitude is controlled by the measured receiving field intensity. To stabilize the amplitude control with respect to fading interference the receiving signal may be averaged over several time frames.

Because the repeater is able to function only in selected channels the use in vehicles requires an adaptation to the respective cell situation, i.e. the frequency channels used in the cell. This is achieved in that the downlink signaling is monitored, i.e. the signals from the base station to the mobile station.

Because of the intelligent control unit in the repeater the latter needs to treat (receive, demodulate and modulate) only the frequencies of that base station (radio cell) in the respective radio network whose signals must be the strongest, in addition to the frequency of the organization channel of the next strongest adjacent cell (which is determined by the repeater's logic).

For this purpose, the intelligent control unit of the repeater is required to monitor the signaling traffic and to extract the following information therefrom:

1. the list of the frequencies used in the strongest cell (serving cell),
2. the list of the organization channels in the adjacent cell,
3. also, depending on the radio system, information on the sequence of frequency hopping including its actual process.

When the repeater moves through a cell its control unit must be capable of making an independent decision about the imminent transition into a new radio cell and select the most suitable cell. If a cell transition (handover) is required, the repeater decreases the level of the strongest cell (serving cell) on the service side and increases the level of the target cell for the transition so that the control system of the radio system automatically initiates the transition of the mobile station connections to the new cell. As soon as the first mobile station served via the repeater has been switched to the new cell, the repeater must be capable of also serving the frequencies of the new, stronger cell. The information on whether a mobile station of the repeated cell is serviced via the repeater or via direct radio contact to the base station is determined by means of the time relation between both directions of the radio traffic and by means of the output of the signal from the mobile station which is received by the repeater.

For each repeater branch the functional units, such as channel filter, demodulator, modulator and transmission amplifier are multiple switched in parallel in accordance with the number of high frequency channels, if applicable.

The repeater receives a frequency standard which is advantageously synchronized via the synchronization channel of the downlink channel coming from the base station. This frequency standard serves as a central clock generator for generating the carrier frequency, the modulation and the burst forming, if applicable, etc.

Remote control and remote monitoring is achieved via a data connection in the form of a radio channel between the repeater and the base station. The radio channel is a component of the channels used by the repeater. The data connection is achieved by means of a componentry which has the functionality of a mobile station with data ability and which is part of the intelligent control unit. The latter may be coupled either directly to the connection antenna or it may be coupled, via a multiplexer/demultiplexer, to the digital data streams of the two repeater branches and access these.

BRIEF DESCRIPTION OF THE SEVERAL VIEWS OF THE DRAWINGS

The invention is explained below in more detail by means of a drawing illustrating only one embodiment. Further significant characteristics and advantages of the invention are found in the drawings and the descriptions thereof.

The drawings show the following.

DETAILED DESCRIPTION OF THE INVENTION

Figure 1:
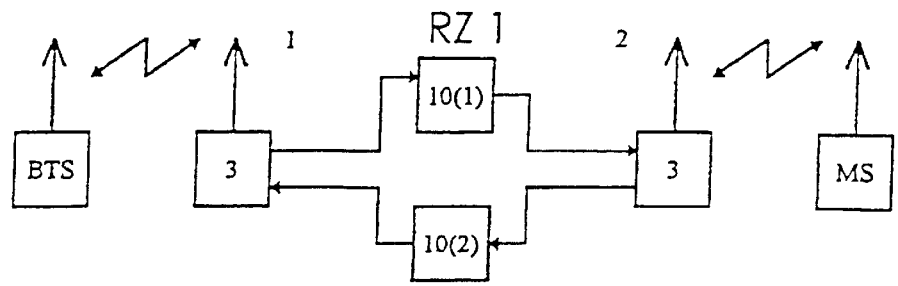
FIG. 1: a schematic illustration of the functional units of a classic repeater according to the state of the art.

A classic repeater as per FIG. 1 substantially performs a bi-directional amplification of the radio signals originating at the base station BTS or a mobile station MS in uplink and downlink direction. The radio signals originating at the base station BTS are received by means of a connection antenna 1 and a downstream duplex filter 3; they are amplified in the downlink repeater branch RZ 1, possibly selected, and retransmitted in the direction of the mobile station MS via a further duplex filter 3 and a service antenna 2. The uplink repeater branch RZ 2 works analog and forwards the signals originating at the mobile station MS to the base station BTS.

Figure 2:
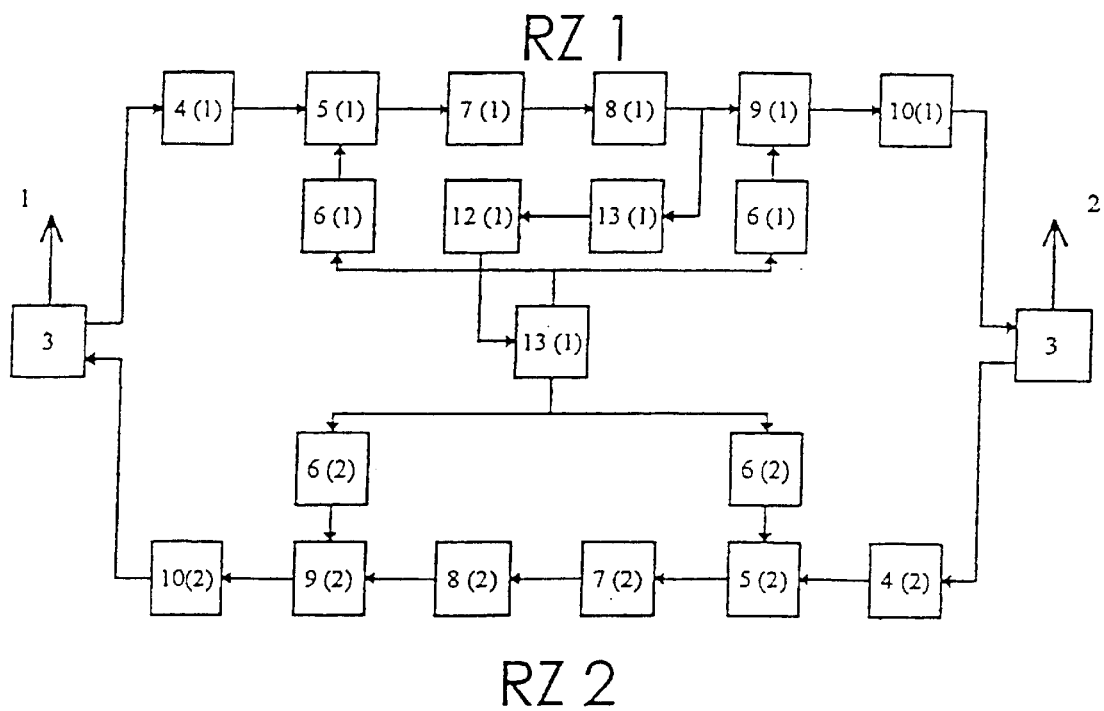
FIG. 2: a schematic illustration of the functional units of the repeater of the invention.

In contrast, the repeater of the invention as per FIG. 2 applies a different method. Following is the description of the process of a downlink signal from the base station BTS to the mobile station MS passing through a first repeater branch RZ 1. The uplink signals are processed by the same method.

The radio signal originating at the base station BTS is transmitted to a pre-amplifier 4 via a duplex filter 3 and reduced via a mixer 5 to its base frequency band or an intermediary frequency, respectively. The combination frequency is generated by a local oscillator 6. The base band signal is transmitted to a demodulator 8 via a channel filter 7. Following the demodulator, there is the demodulated, digital data stream, which is now edited accordingly by a modulator 9 and modulated to a carrier frequency, amplified by a transmission amplifier 10 and emitted from the service antenna 2 to the mobile station via a further duplex filter 3.

The repeater is equipped with an intelligent control unit 12 which monitors and evaluates the signaling traffic between the base stations and the mobile stations and the respective receiving field intensifies. This permits that the connection of the mobile station with a base station is allocated to the respective most suitable base station and supports a cell transition (handover). As a result of this ability the repeater of the invention is predestined for mobile applications.

The control unit 12 is advantageously equipped with a remote control and remote monitoring unit which is triggered via a channel used by the repeater. The digital data stream which is present following the demodulator 8 is branched off, and the signals which are relevant for the control unit are "filtered out" by means of a multiplexer/demultiplexer 13.

The control unit 12 supplies a synchronization signal generated from the data stream to the frequency standard 11 which serves as a central clock generator for all local oscillators 6. The synchronization signal is generated from the synchronization channel of the demodulated signal.

The control unit 12 is connected via a control line at least with the transmission amplifier 10 of the downlink branch, thereby controlling the output of the transmission amplifier 10.

Drawing References 1 connection antenna
2 service antenna
3 duplex filter
4 pre-amplifier
5 mixer
6 local oscillator
7 channel filter
8 demodulator
9 modulator
10 transmission amplifier
11 frequency standard
12 intelligent control unit
13 multiplexer/demultiplexer
BTS base station
MS mobile station

What is claimed is:

1. A mobile repeater for relaying radio signals between mobile stations and one of at least a first and second base station of a cellular radio network, comprising:
   a tunable downlink branch for receiving and demodulating data streams from base station radio signals, and for modulating, amplifying, and retransmitting said data streams as repeater radio signals in network standard format to the mobile stations;
   a tunable uplink branch for receiving and demodulating data streams from mobile station radio signals, and for modulating, amplifying and retransmitting said data streams as repeater radio signals in network standard format to the base station; and
   an intelligent control unit coupled to said downlink branch and said uplink branch for monitoring signaling traffic components of said data streams and for tuning said tunable downlink and uplink branches from frequency channels used for the first base station to frequency channels used for the second base station to support the handover of the relay connection from the first base station to the second base station.

2. The mobile repeater of claim 1, wherein one of said downlink or uplink branch operates in accordance with digital cellular network standards and the other of said downlink or uplink branch operates in accordance with analog cellular network standards.

3. The mobile repeater of claim 2, wherein said intelligent control unit controls the signal output level of said repeater radio signals to force the transition of the relay connection from the first base station to the second base station.

4. The mobile repeater of claim 3, wherein output of said repeater radio signals is controlled by parameters determined as a function of the signaling traffic.

5. The mobile repeater of claim 4, wherein said downlink branch further comprises a controllable transmission amplifier, and output of said controllable transmission amplifier is determined as a function of receiving field intensity of the base station radio signals.

6. The mobile repeater of claim 5, further comprising:
a means for generating a frequency standard for modulating said digital data stream, said frequency standard synchronized with synchronization signals emitted by the base stations.

7. The mobile repeater of claim 6, wherein:
the repeater comprises transmitting and receiving components and multiplexers/demultiplexers;
said intelligent control unit comprises a remote monitoring and remote control unit; and
said remote monitoring and remote control unit uses said transmitting and receiving components and said multiplexers/demultiplexers for communication with the base station via said data streams.

8. The mobile repeater of claim 1, wherein said intelligent control unit controls the signal output level of said repeater radio signals to force the transition of the relay connection from the first base station to the second base station.

9. The mobile repeater of claim 8, wherein output of said repeater radio signals is controlled by parameters determined as a function of the signaling traffic.

10. The mobile repeater of claim 9, wherein said downlink branch further comprises a controllable transmission amplifier, and output of said controllable transmission amplifier is determined as a function of receiving field intensity of the base station radio signals.

11. The mobile repeater of claim 10, further comprising:
a means for generating a frequency standard for modulating said digital data stream, said frequency standard synchronized with synchronization signals emitted by the base stations.

12. The mobile repeater of claim 11, wherein:
the repeater comprises transmitting and receiving components and multiplexers/demultiplexers;
said intelligent control unit comprises a remote monitoring and remote control unit; and
said remote monitoring and remote control unit uses said transmitting and receiving components and said multiplexers/demultiplexers for communication with the base station via data streams.

13. The mobile repeater of claim 1, wherein output of said repeater radio signals is controlled by parameters determined as a function of the signaling traffic.

14. The mobile repeater of claim 13, wherein said downlink branch further comprises a controllable transmission amplifier, and output of said controllable transmission amplifier is determined as a function of receiving field intensity of the base station radio signals.

15. The mobile repeater of claim 14, further comprising:
a means for generating a frequency standard for modulating said digital data stream, said frequency standard synchronized with synchronization signals emitted by the base stations.

16. The mobile repeater of claim 15, wherein:
the repeater comprises transmitting and receiving components and multiplexers/demultiplexers;
said intelligent control unit comprises a remote monitoring and remote control unit; and
said remote monitoring and remote control unit uses said transmitting and receiving components and said multiplexers/demultiplexers for communication with the base station via data streams.

17. The mobile repeater of claim 1, wherein said downlink branch further comprises a controllable transmission amplifier, and output of said controllable transmission amplifier is determined as a function of receiving field intensity of the base station radio signals.

18. The mobile repeater of claim 17, further comprising:
a means for generating a frequency standard for modulating said digital data stream, said frequency standard synchronized with synchronization signals emitted by the base stations.

19. The mobile repeater of claim 18, wherein:
the repeater comprises transmitting and receiving components and multiplexers/demultiplexers;
said intelligent control unit comprises a remote monitoring and remote control unit; and
said remote monitoring and remote control unit uses said transmitting and receiving components and said multiplexers/demultiplexers for communication with the base station via data streams.

20. The mobile repeater of claim 1, further comprising:
a means for generating a frequency standard for modulating said digital data stream, said frequency standard synchronized with synchronization signals emitted by the base stations.

21. The mobile repeater of claim 20, wherein:
the repeater comprises transmitting and receiving components and multiplexers/demultiplexers;
said intelligent control unit comprises a remote monitoring and remote control unit; and
said remote monitoring and remote control unit uses said transmitting and receiving components and said multiplexers/demultiplexers for communication with the base station via data streams.

22. The mobile repeater of claim 1, wherein:
the repeater comprises transmitting and receiving components and multiplexers/demultiplexers;
said intelligent control unit comprises a remote monitoring and remote control unit; and
said remote monitoring and remote control unit uses said transmitting and receiving components and said multiplexers/demultiplexers for communication with the base station via data streams.

23. A method of transitioning a mobile repeater moving through a plurality of base stations including at least a first base station and a second base station, said method comprising:

in a downlink branch, receiving and demodulating data streams from base stations and modulating, amplifying and retransmitting the data streams in network standard format to mobile stations;

in an uplink branch, receiving and demodulating data streams from mobile stations and modulating, amplifying and retransmitting the data streams in network standard format to base stations; and in an intelligent control unit, monitoring signalling traffic components of said data streams and tuning said uplink and downlink branches from frequency channels used for the first base station to frequency channels used for the second base station to support handover of the relay connection from the first base station to the second base station.

24. A method of transitioning a mobile repeater of claim 23, comprising the additional steps of:

monitoring the repeater receiving field intensity of radio signals from at least the first and second base station;

determining when a transition from the first to the second base station is imminent; and retuning repeater frequency channels when transition is imminent from the frequencies used for the first base station to the frequencies used for the second base station.

25. The method of transitioning a mobile repeater of claim 24, wherein the step of determining when a transition is imminent further comprises the steps of:

reducing the level of retransmitted radio signals to the first base station; and increasing the level of retransmitted radio signals to the second base station.

26. The method of transitioning a mobile repeater of claim 24, comprising the additional steps of:

monitoring synchronization signals emitted by the first and second base stations;

generating a frequency standard from base station synchronization signals; and modulating a data stream for transmission using said frequency standard.

27. The method of transitioning a mobile repeater of claim 24, wherein the step of monitoring the repeater receiving field intensity comprises the further steps of:

monitoring signaling traffic of the base stations; and extracting from the signaling traffic the frequencies used by the base stations.

28. A method for operating a repeater as it is moved from cell to cell in a cellular radio network, comprising the steps of:

monitoring signaling traffic of a first base station;

determining a first set of frequency channels used by said first base station;

tuning the repeater to said first set of frequency channels;

receiving and demodulating data streams from said first base station;

modulating, amplifying, and retransmitting said data streams as repeater radio signals to mobile stations;

receiving and demodulating data streams from said mobile stations;

modulating, amplifying, and retransmitting said mobile station data streams as repeater radio signals to said first base station;

monitoring signaling traffic of at least a second base station;

determining a second set of frequency channels used by said second base station;

transitioning the repeater relay connection from said first base station to said second base station; and tuning the repeater from said first set of frequency channels to said second set.

29. The method of claim 28, wherein the step of transitioning the repeater relay connection comprises the additional step of:

controlling the signal output level of said repeater radio signals to force the transition of the repeater relay connection from said first base station to said second base station.

30. The method of claim 28, wherein the step of monitoring signaling traffic of at least a second base station comprises the further steps of:

measuring the repeater receiving field intensity of said first and second base station radio signals; and determining when transition from said first base station to said second base station is required.

31. The method of claim 28, comprising the further step of:

providing a plurality of frequency standards for modulating digital data streams by synchronizing with synchronization signals of said base stations.

32. The method of claim 28, comprising the additional steps of:

editing said data streams for remote monitoring;

remotely monitoring the repeater; and remotely controlling the repeater.

33. The method of claim 28, wherein said repeater simultaneously supports analog and digital cellular network transmissions.

* * * * *